No. 650,895.  
J. P. FAHERTY.  
TOY.  
(Application filed July 15, 1899.)  
(No Model.)  
Patented June 5, 1900.
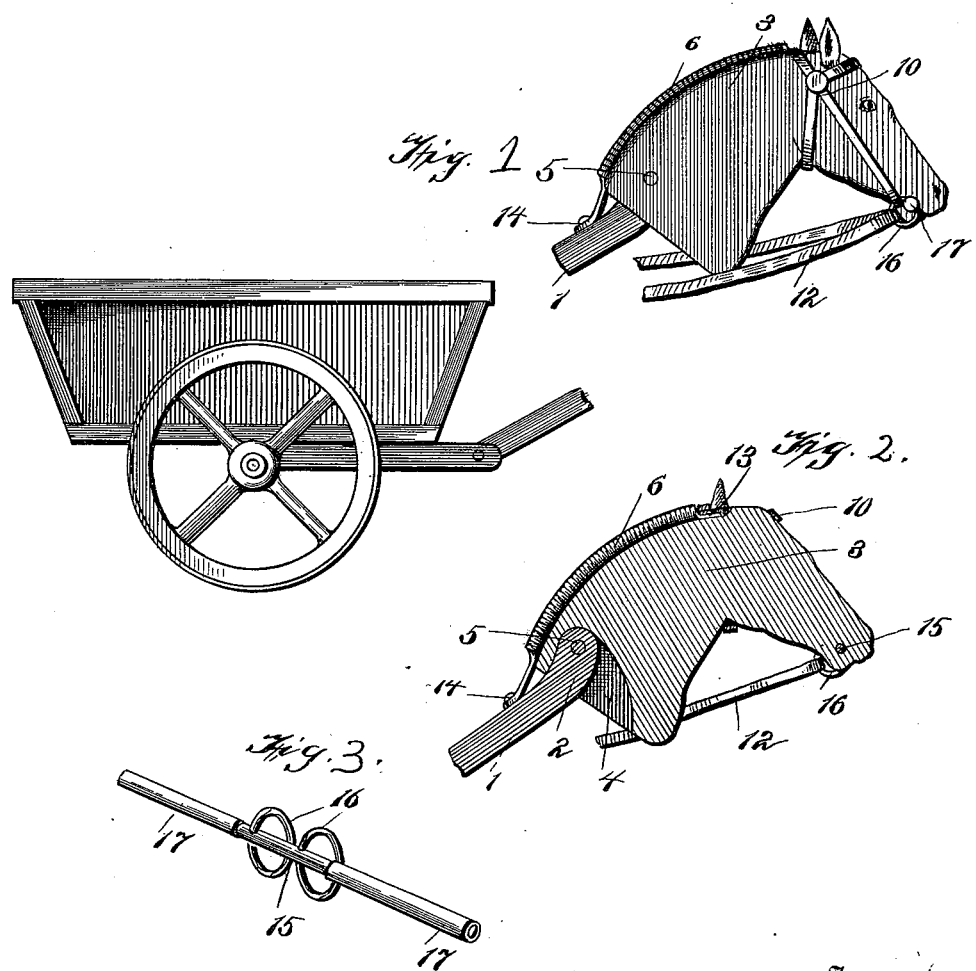
Witnesses  
W. C. Lunsford  
Chas. E. Brock
Inventor  
John P. Faherty.  
by Pincaratt Co  
Attorneys

UNITED STATES PATENT OFFICE.

JOHN P. FAHERTY, OF RANKIN STATION, PENNSYLVANIA.

TOY.

SPECIFICATION forming part of Letters Patent No. 650,895, dated June 5, 1900.

Application filed July 15, 1899. Serial No. 723,926. (No model.)

*To all whom it may concern:*

Be it known that I, JOHN P. FAHERTY, a citizen of the United States, residing at Rankin Station, in the county of Allegheny and State of Pennsylvania, have invented a new and useful Toy, of which the following is a specification.

My invention relates to toys; and it consists of a pole or stick upon which is mounted a wooden block cut in the shape of a horse's head, to be resiliently mounted upon one end of the said stick or pole, the object of the invention being to produce a drag-stick or wagon-pole carrying the head of the horse, susceptible of being moved in a lifelike manner; and with this object in view my invention consists of the parts and combination of parts, as will be hereinafter more fully set out.

In the drawings which accompany and form a part of this application, Figure 1 is a side elevation of my invention applied to the pole of a wagon, parts being broken away. Fig. 2 is a detail sectional view of the same. Fig. 3 is a perspective view of a bit.

1 represents the stick or pole, which may be used as a drag-stick or as a pole for a wagon or cart and be of suitable length and diameter. The upper end of the stick or pole is given an upward turn, as at 2, and provided with an opening at such end.

3 is a block cut to represent the head of a horse and hollowed out, as at 4. The end 2 of the stick or pole is pivoted in the hollowed-out portion 4 by means of the pivot 5, thus securing the head to leave it free to be moved up or down.

6 is a coiled spring, one end of which is secured at 7 to the horse's head, while the other end is secured at 8 to the stick or pole.

10 is a bridle having the bit 11 and the reins 12, all properly secured upon the head of the horse.

In the construction all parts of the head and stick are as just described. The spring is secured at one end between the ears of the horse's head, as at 13, while the other end is secured to the top of the pole or stick at 14, just back of the upturned end. It will be noticed that the coil-spring in this construction is secured upon the top of the neck of the horse, thus giving the effect of a short mane.

When this improved toy is used as a pole for a wagon, I use the bit shown in Fig. 3, which comprises the bit 15, the rein-rings 16, and the laterally-extending handles 17. The bit is secured in the mouth of the horse by running it through an opening 18. The rings 16 are then passed through holes in the bit on each side of the mouth, and the handles being of tubular construction are then slipped upon the ends of the bit 15 until their inner ends are snug against the sides of the horse's mouth.

The construction shown in Fig. 1 is adapted to be used as a drag-stick, placing it between the legs—as the boys say, "play horse." The stick is held elevated at its forward end by means of the reins 12. When a boy using this stick stops running, he pulls back upon the reins, thereby compressing the coiled spring and lowering the head of the horse after the usual manner of driving. As soon as he commences to run he allows the reins to slip forward, thereby relieving the tension upon the spring 12, whereupon the spring expands, and thus throws the head of the horse upward.

When the device is used in connection with a pole of a wagon, the handles 17 are attached to the bit, as shown in Fig. 3. In use a boy catches hold of each handle, and a slight pull on the reins by the boy in the cart will move the handles with the head as a signal to start, and when the occupant of the cart or wagon desires to stop he pulls hard backward upon the reins, thereby lowering the head and handles, and the lowering of the handles lowers the hands of the boys pulling, as a signal to stop. Thus it will readily be seen that with my invention boys can very vividly play "horse" and at the same time secure beneficial exercise of the muscles of the arms.

Having thus fully described my invention, what I claim as new, and desire to secure by Letters Patent of the United States, is—

1. In a toy, the combination with a stick or pole, of an animal's head pivotally mounted thereon, a longitudinally-arranged groove formed in the upper edge thereof, a coiled spring secured in said groove one end of which is secured to the stick or pole, the other end being secured to the head at the forward end of said groove, whereby the head will be held normally in an upright position.

2. In a toy, a block shaped to represent the head of an animal, a hollowed-out portion or recess increasing in depth toward the top of the block and formed in the rear end of said block, a groove in the top edge of the block, and a stick or pole, one end of which is curved upward and pivoted in the said hollowed-out portion or recess, and a coiled spring secured in the groove in the top edge of said block one end of which is rigidly secured to the block while the other end is rigidly secured to the pole or stick.

JOHN P. FAHERTY.

Witnesses:
  WILLIAM E. KENNEDY,
  HARRY S. WALKER.